United States Patent Office 3,699,009
Patented Oct. 17, 1972

3,699,009
USE OF COKE IN ELECTRODEPOSITABLE
COMPOSITIONS
Joseph E. Plasynski, Arnold, and Robert D. Jerabek,
Glenshaw, Pa., assignors to PPG Industries, Inc., Pittsburgh, Pa.
No Drawing. Filed Mar. 29, 1971, Ser. No. 129,266
Int. Cl. B01k 5/02; C23b 13/00
U.S. Cl. 204—181                                    5 Claims

ABSTRACT OF THE DISCLOSURE

This invention relates to novel, pigmented, electrodepositable compositions. More particularly, this invention relates to the use of coke in pigmentary form to produce black, grey or dark-colored electrodepositable compositions.

STATE OF THE ART

Electrodeposition of certain materials, including waxes and synthetic resins, have been known in the art for some time. Likewise, U.S. 3,230,162, as well as other relatively recent patents describe a method and compositions of the type presently utilized in the field of automotive finishing and industrial coatings.

While electrodeposition is in many respects advantageous as compared to ordinary application methods, problems have arisen in finding a black pigment which is suitable for all purposes in electrodeposition. For example, carbon black, the universally-used black pigment, displays several undesirable characteristics in electrodepositable compositions. In U.S. Pat. 3,493,482, description of the problems inherent to carbon black are set forth, as well as the use of pulverulent coal, especially anthracite coal, as an alternative black pigment which is superior to carbon black in many respects in electrodepositable compositions.

The use of coal, however, while meeting many of the objections to carbon black has not been wholly satisfactory in all applications. A problem of pigment migration has been noted and frequently coal does not migrate at the same rate as the vehicle, especially in instances where non-uniform electrical fields and bath agitation (particle velocity) exist. In these instances an uneven color appearance occurs due to uneven pigment distribution on the coated article.

DESCRIPTION OF THE INVENTION

It has now been found that the use of pulverulent coke as a black pigment greatly improves color fading, increases the rupture voltage of the composition, and allows for improved throw power as compared to coal as a pigment. The vehicle resin plays little part in producing the effects noted and the improvement is seen in substituting coke in pigmentary form in virtually every electrodepositable composition.

The cokes which may be utilized in the compositions of the invention comprise those cokes which are derived from coal or from petroleum. These materials are defined in the Encyclopedia of Chemical Technology, Kirk and Othmer, vol. 3, Intercience Publishers (1949) (Carbonization). The coke which may be employed includes those materials known as high-temperature coke, medium-temperature coke, and low-temperature coke. Likewise, petroleum coke may be utilized. Coke is generally derived from the thermal cracking of heavy oils in the petroleum refining process (Kirk and Othmer, supra, vol. 10). Another source of coke which may be utilized is pitch coke, "Pitch," vol. 13, Kirk and Othmer, supra. Thus, the term "coke," as utilized throughout the specification and claims, encompasses those materials well known and defined in the art as coke, regardless of its manufacturing source.

A number of electrodepositable resins are known and can be employed to provide the electrodepositable compositions which may be employed in this invention. Virtually any water-soluble, water-dispersible, or water-emulsifiable polyacid or polybasic resinous material can be electrodeposited and, if film-forming, provides coatings which may be suitable for certain purposes. Any such electrodepositable composition is included among those which can be employed in the present invention, even though the coating obtained might not be entirely satisfactory for certain specialized uses.

Presently, the most widely used electrodeposition vehicle resins are synthetic polycarboxylic acid resinous materials. Numerous such resins are described in U.S. Pats. Nos. 3,441,489; 3,442,044; 3,403,088; 3,369,983 and 3,366,563, which are incorporated by reference. These include a reaction product or adduct of the drying oil or semi-drying oil fatty acid ester with a dicarboxylic acid or anhydride. By drying oil or semi-drying oil fatty acid esters are meant esters of fatty acids which are or can be derived from drying oils or semi-drying oils, or from such sources as tall oil. Such fatty acids are characterized by containing at least a portion of polyunsaturated fatty acids. Preferably, the drying oil or semi-drying oil per se is employed.

Also included among such esters are those in which the esters themselves are modified with other acids, including saturated, unsaturated or aromatic acids or an anhydride thereof. The acid-modified esters are made by transesterification of the ester, as by forming a di- or monoglyceride by alcoholysis, followed by esterification with the acid; they may also be obtained by reacting oil acids with a polyol and reacting the acid with the partial ester. In addition to glycerol, alcoholysis can be carried out using the other polyols such as trimethylolpropane, pentaerythritol, sorbitol and the like. If desired, the esters can also be modified with monomers such as cyclopentadiene or styrene and the modified esters produced thereby can be utilized herein. Similarly, other esters of unsaturated fatty acids, for example, those prepared by the esterification of tall oil fatty acids with polyols, are also useful.

Also included within the terms "drying oil fatty acid esters," as set forth herein, are alkyd resins prepared utilizing semi-drying or drying oils; esters of epoxides with such fatty acids, including esters of diglycidyl ethers or polyhydric compounds as well as other mono- di- and polyepoxides, semi-drying or drying oil fatty acid esters of polyols, such as butanediol, trimethylolethane, trimethylolpropane, trimethylolhexane, pentaerythritol, and the like; and semi-drying or drying fatty acid esters of resinous polyols such as homopolymers or copolymers of unsaturated aliphatic alcohols, e.g., allyl alcohol or methallyl alcohol, including copolymers of such alcohols with styrene or other ethylenically unsaturated monomers or with non-oil modified alkyd resins containing free hydroxyl groups.

Any alpha,beta-ethylenically unsaturated carboxylic acid or anhydride can be employed to produce the reaction products described herein. These include such anhydrides as maleic anhydride, itaconic anhydride, and other similar anhydrides. Instead of the anhydride, there may also be used ethylenically unsaturated dicarboxylic acids which form anhydrides, for example, maleic acid or itaconic acid. These acids appear to function by first forming the anhydride. Fumaric acid, which does not form an anhydride, may also be utilized, although in many instances it requires more stringent conditions than the unsaturated dicarboxylic acid anhydrides or acids which form such anhydrides. Mixtures of the above acids or anhydrides may also be utilized. Generally speaking, the anhydride or acid employed contains from 4 to 12 carbon atoms, although longer chain compounds can be used if so desired.

While the reaction products can be comprised solely of adducts of the fatty acil ester and the dicarboxylic acid or anhydride, in many instances it is desirable to incorporate into the reaction product another ethylenically unsaturated monomer. The use of such monomer often produces films and coatings which are harder and more resistant to abrasion and which may have other similarly desirable characteristics.

As shown in the art, it is preferred that in certain instances the neutralization reaction be carried out in such a manner that amido groups are attached to part of the carbonyl carbon atoms derived from the dicarboxylic acid or anhydride.

Compositions within this general class are described in U.S. Pats. Nos. 3,366,563 and 3,369,983.

Another vehicle comprises the fatty acid ester, unsaturated acid or anhydride reaction products and any additional unsaturated modifying materials (as described above) which are further reacted with the polyol.

Essentially any polyol can be employed, but diols are preferred. When higher polyols, such as trimethylolpropane, glycerol, pentaerythritol and the like are utilized, they are employed in small amounts, or in conjunction with the diol, or in the presence of a monohydric alcohol, and are used with adducts having a relatively low proportion of acidic component. Water-insoluble diols are often preferable, and especially desirable water-dispersed compositions for electrodeposition are obtained using 2,2-bis(4-hydroxycyclohexyl)propane (which has given the best results), neopentyl glycol, 1,1'-isopropylidene-bis(p-phenyleneoxy)di-2-propanol, and similar diols.

The proportions of the polyol and ester-anhydride adduct which are employed depend upon various factors, but are, in general, limited only by the need to avoid gelatin of the product. The total functionality of the reactants is a guide to determining the optimum proportions to be employed, and in most instances should not be greater than about 2.

In many instances, only part of the anhydride groups of the adduct, e.g., about 10 percent, are reacted with the polyol. Of those anhydride groups reacted, it is preferred the only one of the carboxyl groups is esterified in each instance.

The product contains a substantial part of the original acidity derived from the dicarboxylic acid or anhydride; ordinarily the product should have an acid number of at least about 20. To provide a water-dispersed product, such as is used in electrodeposition processes, at least part of the remaining acidic groups are neutralized by reaction of the partially-esterified product with a base.

The polyol reaction products and reaction conditions are more fully described in application Ser. No. 450,205, filed Apr. 22, 1965, now U.S. Pat. 3,565,781, as well as the art cited above.

Another type of electrodepositable coating composition which gives desirable results are the water-dispersible coating compositions comprising at least partially-neutralized interpolymers of hydroxyalkyl esters of unsaturated carboxylic acids, unsaturated carboxylic acids, and at least one other ethylenically unsaturated monomer. These are empoyed in the composition along with an amine-aldehyde condensation product, with the interpolymer usually making from about 50 percent to about 95 percent by weight of the resinous composition.

The acid monomer of the interpolymer is usually acrylic acid or methacrylic acid, but other ethylenically unsaturated monocarboxylic and dicarboxylic acids of up to about 6 carbon atoms can also be employed. The hydroxyakyl ester is usually hydroxyethyl or hydroxypropyl acrylate or methacrylate, but also desirable are the various hydroxyalkyl esters of the above acids having, for example, up to about 5 carbon atoms in the hydroxyalkyl radical. Mono- or diesters of the dicarboxylic acids mentioned are included. Ordinarily, the acid and ester each comprise between about one perecnt and about 20 percent by weight of the interpolymer, with the remainder being made up of one or more other copolymerizable ethylenically unsaturated monomers. The most often used are the alkyl acrylates, such as ethyl acrylate; the alkyl methacrylates, such as methyl methacrylate; and the vinyl aromatic hydrocarbons, such as styrene, but others can be utilized.

The above interpolymer is at least partially neutralized by reaction with a base as described above; at least about 10 percent and perferably 50 percent or more of the acidic groups are neutralized, and this can be carried out either before or after the incorporation of the interpolymer in the coating composition.

The amine-aldehyde condensation products included in these compositions are, for example, condensation products of melamine, benzoguanamine, or urea with formaldehyde, although other amine-containing amines and amides, including triazines, diazines, triazoles, guanadines, guanamines and alkyl and aryl-substituted derivatives of such compounds can be employed, as can other aldehydes, such as acedaldehyde. The alkylol groups of the products can be etherified by reaction with an alcohol and the products utilized can be water-soluble or organic solvent-soluble.

Electrodeposition compositions comprising the above interpolymers and an amine-aldehyde resin are more fully described in U.S. Pat. No. 3,403,088.

Still another electrodepositable composition of desirable properties comprises an alkyd-amine vehicle, that is, a vehicle containing an alkyd resin and an amine-aldehyde resin. A number of these are known in the art and may be employed. Preferred are water-dispersible alkyds such as those in which a conventional alkyd (such as a glyceryl phthalate resin), which may be modified with drying oil fatty acids, is made with a high acid number (e.g., 50 to 70) and solubilized with ammonia or an amine, or those in which a surface-active agent, such as a polyalkylene glycol (e.g., "Carbowax"), is incorporated. High acid number alkyds are also made by employing a tricarboxylic acid, such as trimellitic acid or anhydride, along with a polyol in making the alkyd.

The above alkyds are combined with an amine-aldehyde resin, such as those described hereinabove. Preferred are water-soluble condensation products of melamine or a similar triazine with formaldehyde with subsequent reaction with an alkanol. An example of such a product is hexakis(methoxymethyl)melamine.

The alkyd-amine compositions are dispersed in water and they ordinarily contain from about 10 percent to about 50 percent by weight of amine resin, based on the total resinous components.

Yet another electrodepositable composition of desirable properties comprises mixed esters of a resinous polyol. These resin esters comprise mixed esters of an unsaturated fatty acid adduct. Generally the polyols which are utilized with these resins are essentially any polyol having a molecular weight between about 500 and 5000. Such resinous polyols include those resinous materials containing oxirane rings which can be opened in, prior to, or during the esterification reaction to provide an apparent hydroxy site. The vehicle resins are formed by reacting a portion of the hydroxyl groups of the polyol with the fatty acid, the ratio of the reactions being such that at least an average of one hydroxyl group per molecule remains unreacted. The remaining functionality is then reacted with the unsaturated fatty acid adduct of an olefinically unsaturated dicarboxylic anhydride, such as maleic anhydride, this second esterification reaction being conducted under conditions so that esterification occurs through the anhydride ring, thereby introducing free acid groups into the molecule. Mixed acids of the class described are disclosed in Belgian Pat. No. 641,642, as well as copending application Ser. No. 568,144, filed July 27, 1966, now abandoned.

In order to produce an electrodepositable composition, it is necessary to at least partially neutralize the acid groups present with a base in order to disperse the resin in the electrodeposition bath. Inorganic bases such as metal hydroxides, especially potassium hydroxide, can be used. There may, likewise, be used ammonia or organic bases, especially water-soluble amines, such as, for example, the mono-, di- and tri-lower alkyl amines such as methylamine, ethylamine, propylamine, butylamine, dimethylamine, diethylamine, dipropylamine, dibutylamine, and m-methyl-butylamine, triethylamine, tributylamine, methyldiethylamine, dimethylbutylamine, and the like; cyclic amines such as morpholine, pyrrolidine, piperidine; diamines such as hydrazine, methyl-hydrazine, 2,3-toluene diamine, ethyl diamine and piperizine and substituted amines such as hydroxylamine, ethanolamine, diethanolamine, butanolamine, hexanolamine, and methyldiethanolamine, octanolamine, diglycolamine and other polyglycolamines, triethanolamine, and methylethanolamine, n-amino-ethanolamine and methyldiethanolamine and polyamines such as diethylene triamines.

There may be present in the electrodepositable composition any of the conventional types of pigments employed in the art. There is often incorporated into the pigment composition a dispersing or surface-active agent. Usually the pigment or surface-active agent, if any are ground together in a portion of the vehicle, or alone, to make a paste and this is blended with the vehicle to produce a coating composition.

In many instances, it is preferred to add to the bath in order to aid dispersibility, viscosity and/or film quality, a non-ionic modifier or solvent. Examples of such materials are aliphatic, naphthenic and aromatic hydrocarbons or mixtures of the same; mono- and dialkyl ethers of glycols, pine oil and other solvents compatible with the resin system. The presently preferred modifier is 4-methoxy-4-methyl pentanone-2 (Pent-Oxone).

There may also be included in the coating composition, if desired, additives such as antioxidants. For example, orthoamyl phenol or cresol. It is especially advantageous to include such antioxidants in coating compositions which are used in baths which may be exposed to atmospheric oxygen at elevated temperatures and with agitation over extended periods of time.

Other additives which may be included in coating compositions, if desired, include, for example, wetting agents such as petroleum sulfonates, sulfated fatty amines, or their amides, esters of sodium isothionates, alkyl phenoxypolyethylene alkanols, or phosphate esters including ethoxylated alkylphenol phosphates. Other additives which may be employed include antifoaming agents, suspending agents, bactericides, and the like.

In formulating the coating composition, ordinary tap water may be employed. However, such water may contain a relatively high level of metals and cations which, while not rendering the process inoperative, these cations may result in variations of properties of the baths when used in electrodeposition. Thus, in common practice, deionized water, i.e., water from which free ions have been removed by the passage through ion exchange resins, is invariably used to make up coating compositions of the instant invention.

In addition to the electrodepositable vehicle resins described above, there may be present in the electrodepositable composition other resinous materials which are non-carboxylic acid materials. For example, as shown above, there may be added up to about 50 percent by weight of an amine-aldehyde condensation product.

Other base-solubilized polyacids which may be employed as electrodeposition vehicles include those taught in U.S. Pat. No. 3,392,165, which is incorporated herein by reference, wherein the acid groups rather than being solely polycarboxylic acid groups contain mineral acid groups such as phosphonic, sulfonic, sulfate and phosphate groups.

The process of the instant invention is equally applicable to cationic type vehicle resins, that is, polybases solubilized by means of an acid, for example, an amine-terminated polyamide or an acrylic polymer solubilized with acetic acid. Another case of such cationic polymers is described in copending application Ser. No. 772,366, filed Oct. 28, 1968, now abandoned.

In a manner similar to the anionic resins described above, the cationic resins may be formulated with adjuvants, such as pigments, solvents, surfactants, cross-linking resins, and the like.

The polyacids are anionic in nature and are dispersed or dissolved in water with alkaline materials such as amines or alkaline metal hydroxides and, when subjected to an electric current, they migrate to the anode. The polybasic resins, solubilized by acids are cationic in character and when these resins are water-dispersed or solubilized with an acid such as acetic acid, the material deposits on the cathode under an electric current.

The coke is introduced into the compositions of the invention in the same manner as conventional pigments are dispersed. Preferably, the coke is reduced to a small particle size, usually less than about 200 mesh and, preferably, less than about 25 microns and, more preferably, below 10 microns, before being added to the vehicle. If large particles of coke are introduced, obviously a longer grinding time will be required for the desired size reduction.

The coke is dispersed by grinding in the presence of at least a portion of the vehicle resin and, in most cases, a surfactant or dispersing agent, or in surfactant or dispersing agent with later addition of a vehicle resin. Grinding is accomplished by the use of ball mills, sand mills, continuous attritors, and the like, until the pigment has been reduced to the desired size, and, preferably, has been wet by and dispersed in the vehicle resin and/or dispersing agent.

Preferably, in an anionic system, the grinding is conducted in an aqueous dispersion of neutralized resin having a pH above about 7 and preferably about 9.0. The amount of water present in such an aqueous grind is not critical; however, commonly the resin employed in the grinding step is about 30 to 70 percent solids. The use of more water merely reduces the effective capacity of the mill and, while less water can be employed, the viscosity creates some problems in certain instances.

The pigment-binder ratio in the grinding step is not critical; however, levels between about 3.5/1 and 7/1 are frequently employed, although other levels may be utilized.

After grinding, the particle size should be in the range of 10 microns or less, preferably as small as practicable.

Generally a Hegman grind gauge reading of about 7 is the minimum for a presently commercially-acceptable composition.

For a general review of pigment grinding and paint formulation, reference may be had to: D. H. Parker, Principles of Surface Coating Technology,, Interscience Publishers, New York (1965); R. L. Yeates,, Electropainting, Robert Draper Ltd., Teddington,, England (1966); H. F. Payne, Organic Coating Technology, vol. II, Wiley & Sons, New York (1961).

In addition to the pigment of the invention, there may be present in the electrodepositable composition any of the conventional types of pigments employed in the art, for example, iron oxide, lead silico chromate, strontium chromate, carbon black, titanium dioxide, talc, barium sulfate, and the like, as well as combinations of these and similar pigments. Color pigments such as cadmium yellow, cadmium red, phthalocyanine blue, chrome yellow, toluidine red, hydrated iron oxide and the like, may be included if desired. There is often incorporated into the pigment composition a dispersing or surface-active agent. If susch a surface-active agent is used, it should be the non-ionic or anionic type or a combination of these types in an anionic system and non-ionic or cationic in a cationic system. Usually the pigment or surface-active agent, if any, are ground together in a portion of the vehicle, or alone, to make a paste and this is blended with the vehicle to produce a coating composition.

It has been found especially important to regulate the ratio of pigment to the vehicle in compositions which are used in electrodeposition processes. In most instances, the most desirable coatings are obtained when the coating composition contains a ratio of pigment-to-vehicle or not higher than 2-to-1. If the composition has too high a pigment-to-vehicle ratio, the electrodeposited films may exhibit very poor flow characteristics and, in many instances, are non-continuous and have poor film appearance.

In the electrodeposition process, a process well-described in the art, the aqueous bath containing the composition is placed in contact with an electrically-conductive anode, and an electrically-conductive cathode. The coating is deposited upon one electrode so that the metal substrate to be coated is used as that electrode. Upon passage of electric current (normally direct current) between the anode and the cathode while in contact with the bath containing the coating composition, an adherent film of the coating composition is deposited on the electrode.

The conditions at which the electrodeposition process is carried out are those conventionally used in electrodeposition. The applied voltage may vary greatly and can be as low as, for example, one volt or as high, for example, as 500 volts or higher. It is typically between 50 and 350 volts. The current tends to decrease during electrodeposition and the films become electrically insulative and cause the deposition of film to be self-terminating at any particular voltage.

The electrode coated may be any electrically-conductive metal, such as iron, steel, aluminum, galvanized steel, phosphatized steel, zinc, and the like.

The concentrations of the coating composition in the aqueous bath used in electrodeposition is not critical and relatively high levels of coating composition can be used; however, it is ordinarily desirable to use a low concentration of coating composition since this is one of the benefits inherent in the system. Baths containing as little as one percent by weight of the coating composition in water can be employed. In general practice, the baths usually contain between 5 and about 15 percent by weight of paint solids. Generally, it is preferred not to use more than 20 or 25 percent by weight of the coating composition in the bath, although there is no technical reason why films cannot be produced in even higher levels. Once the film is deposited upon the substrate and the substrate removed from the bath, the article is treated as one which has been coated in the conventional painting operation. The article may be air-dried, or, usually, it is heated in an oven or by some other appropriate means to bake or dry the film. When this is done, the baking temperatures of about 275° F. to about 500° F. for 60 to 10 minutes are usually employed.

The invention is further described in conjunction with the following examples which are to be considered illustrative rather than limiting. All parts and percentages in the examples and throughout this specification are by weight unless otherwise stated.

EXAMPLE

The vehicle resin in this example is a maleinized tall oil fatty acid ester of a styrene-allyl alcohol copolymer of 1100 molecular weight and 5 hydroxyl functionality comprising 55.5 percent tall oil fatty acids, 38.5 percent of the copolymer and 6.0 percent maleic anhydride with an intrinsic viscosity of 120,000 centipoises and an acid value of 41.

An electrodepositable composition was prepared as follows:

A pigment paste was prepared as follows: Into a steel ball mill was charged:

|  | Parts by weight |
|---|---|
| Grinding vehicle: 20% maleinized linseed oil—97.5%; diethylamine—1.5%; cresylic acid—1.0% | 313.0 |
| Diethylamine | 39.5 |
| Deionized water | 509.0 |

The above was mixed and there was added:

|  | Parts by weight |
|---|---|
| Diethylamine | 6.4 |
| Deionized water | 288.0 |
| Dispersing agent (Witco 912—combination oil-soluble sulfonate and non-ionic surfactant) | 34.2 |
| Lead silicate | 120.5 |
| Cation-modified clay (Bentone 11) | 14.4 |
| Strontium chromate | 25.9 |
| Manganese dioxide | 47.7 |
| Pulverized foundry coke (high-temperature carbonized coal) | 617.9 |

The above, combined with mixing, was ground to a reading of 7 on a Hegman grind gauge. This paste was designated Paste A.

In an identical manner a pigment paste was prepared replacing the coke with pulverized anthracite coal as described in U.S. Pat. 3,493,482. This paste was designated Paste B.

The electrodepositable composition was formed from a two-component resin/pigment paste system and comprised:

|  | Parts by weight |
|---|---|
| Vehicle resin (above) | 492.6 |
| 4-methoxy-4-methyl pentanone-2 | 123.2 |
| Allylether of methylolated phenol (Methylon 75108) | 47.9 |
| Triethylamine | 22.8 |
| Deionized water | 3641.2 |
| Pigment Paste A | 98.5 |

This composition contained 13.4 percent solids, had a pH of 7.95 and a pigment-to-binder ratio of .07/1.0. This was designated electrodepositable Composition A.

An identical composition was formed from Pigment Paste B (i.e., anthracite coal replacing the coke of Composition A).

The compositions were compared by electrodeposition on zinc phosphated steel panels at a bath temperature of 70° F. The bath was insulated and the cathode area was one-half the anode area.

TABLE I

| Composition | Voltage | Time (minutes) | Film build (mils) | Appearance | Throw (Ford tube and strip test, 12 inch dip) |
|---|---|---|---|---|---|
| A | 580 | 2 | | Film rupture | |
|   | 560 | 2 | .8-.85 | Smooth film, no pigment fading. | |
|   | 400 | 2 | .7-.75 | Very slight texture, no pigment fading. | 8¾ inches. |
|   | 250 | 2 | .55 | Smooth film. No pigment fading. | |
| B | 320 | 2 | | Film rupture | |
|   | 300 | 2 | 1.2 | Pigment fading at edges | 6¾ inches. |
|   | 250 | 2 | .75-.8 | ....do | |

Coke was demonstrated to be substantially improved over coal with regard to rupture voltage, throw power at the same film builds and demonstrated substantially better pigment migration properties.

Various other electrodepositable compositions such as those hereinabove described can be substituted for those of the examples. In the above and other tests, the general applicability of the compositions and methods herein have been shown and it has been found that good results are attained using varying compositions, electrodeposition conditions and substrates.

According to the provisions of the Patent Statutes, there are described above the invention and what are now considered its best embodiments; however, within the scope of the appended claims, it is to be understood that the invention can be practiced otherwise than as specifically described.

What is claimed is:

1. In a process for electrocoating an electrode with a paint in an electric circuit comprising a bath of aqueous medium in electrical contact with an anode and a cathode, the improvement comprising dispersing in said bath a paint comprising an ionically-solubilized synthetic resin vehicle having dispersed therein coke in pigmentary form.

2. A method as in claim 1 wherein the pigment-binder ratio is below about 1-to-1.

3. The method of claim 2 wherein the resin is a base-solubilized polycarboxylic acid resin.

4. The method of claim 3 wherein the resin in a maleinized fatty acid ester of a resinous polyol.

5. An article electrocoated by the process of claim 1.

References Cited

Kays: Journal of Paint Technology, No. 499, vol. 38 (August 1966), pp. 440–442.

HOWARD S. WILLIAMS, Primary Examiner